US010630396B2

(12) United States Patent
Zhuang et al.

(10) Patent No.: US 10,630,396 B2
(45) Date of Patent: Apr. 21, 2020

(54) METHOD AND APPARATUS FOR REDUCING INTERFERENCE FROM MOBILE INDUSTRY PROCESSOR INTERFACE TO COMMUNICATION QUALITY (71) Applicant: HUAWEI TECHNOLOGIES CO., LTD., Shenzhen (CN)

(72) Inventors: Xinglong Zhuang, Shanghai (CN); Tao Ma, Shanghai (CN); Zhimin Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 15/953,493

(22) Filed: Apr. 15, 2018

(65) Prior Publication Data

US 2018/0234191 A1 Aug. 16, 2018

Related U.S. Application Data (63) Continuation of application No. PCT/CN2016/101814, filed on Oct. 11, 2016.

(30) Foreign Application Priority Data

Oct. 16, 2015 (CN) .......................... 2015 1 0676891

(51) Int. Cl.
*H04B 15/04* (2006.01)
*H04L 12/24* (2006.01)
(Continued)

(52) U.S. Cl.
CPC .............. *H04B 15/04* (2013.01); *G09G 3/36* (2013.01); *H04L 41/0816* (2013.01);
(Continued)

(58) Field of Classification Search
CPC ......... G09G 2310/08; G09G 2330/021; G09G 2340/0435; G09G 3/2096; G09G 5/006;
(Continued)

(56) References Cited

U.S. PATENT DOCUMENTS 8,417,983 B2   4/2013  Machnicki et al.
2012/0127133 A1  5/2012  Frank
(Continued)

FOREIGN PATENT DOCUMENTS

CN   103379643 A   10/2013
CN   103684489 A   3/2014
(Continued)

*Primary Examiner* — Ajibola A Akinyemi
(74) *Attorney, Agent, or Firm* — Kilpatrick Townsend & Stockton LLP (57) ABSTRACT A mobile industry processor interface MIPI clock frequency configuration method and apparatus are provided. When a radio frequency band used by a device on which an MIPI is located changes, an MIPI clock frequency is determined according to radio frequency band information, where the radio frequency band information includes the radio frequency band currently used by the device, and the determined MIPI clock frequency causes no interference to the radio frequency band currently used by the device; and an MIPI clock frequency of the device is configured as the determined MIPI clock frequency. According to the technical solutions in the present invention, when a radio frequency band of a device changes, an MIPI clock frequency causes no interference to communication of the device, thereby improving communication quality and stability of the device.

18 Claims, 6 Drawing Sheets (51) Int. Cl.
*G09G 3/36* (2006.01)
*H04W 52/02* (2009.01)
*G09G 3/20* (2006.01)

(52) U.S. Cl.
CPC ....... *H04W 52/027* (2013.01); *H04W 52/029* (2013.01); *H04W 52/0212* (2013.01); *H04W 52/0238* (2013.01); *G09G 3/2096* (2013.01); *G09G 2310/08* (2013.01); *G09G 2330/021* (2013.01); *G09G 2370/02* (2013.01); *Y02D 70/00* (2018.01); *Y02D 70/1262* (2018.01); *Y02D 70/21* (2018.01)

(58) Field of Classification Search
CPC ........... G09G 2330/06; G09G 2340/02; G09G 2370/10; G09G 3/36; G09G 2320/064; G09G 2340/04; G09G 2360/16; G09G 2370/08; G09G 3/20; G09G 3/2092; G09G 3/3648; G09G 2310/04; G09G 2320/029; G09G 2340/14; G09G 2360/12
USPC .......................................................... 455/75
See application file for complete search history.

(56) References Cited

U.S. PATENT DOCUMENTS

| | | | |
|---|---|---|---|
| 2012/0144224 A1* | 6/2012 | Machnicki | G06F 1/08 713/500 |
| 2014/0218352 A1 | 8/2014 | Zhao et al. | |
| 2014/0287795 A1* | 9/2014 | Lee | H04J 3/0685 455/550.1 |
| 2016/0282921 A1* | 9/2016 | Kodavalla | G06F 1/324 |

FOREIGN PATENT DOCUMENTS

| | | |
|---|---|---|
| CN | 103974267 A | 8/2014 |
| CN | 105357033 A | 2/2016 |
| EP | 2592522 A2 | 5/2013 |
| WO | 2013152542 A1 | 10/2013 |

* cited by examiner

METHOD AND APPARATUS FOR REDUCING INTERFERENCE FROM MOBILE INDUSTRY PROCESSOR INTERFACE TO COMMUNICATION QUALITY

CROSS-REFERENCE TO RELATED APPLICATIONS

This application is a continuation of International Application No. PCT/CN2016/101814, filed on Oct. 11, 2016, which claims priority to Chinese Patent Application No. 201510676891.7, filed on Oct. 16, 2015. The disclosures of the aforementioned applications are hereby incorporated by reference in their entireties.

TECHNICAL FIELD

The present invention relates to the field of communications technologies, and in particular, to a method and an apparatus for reducing interference from a mobile industry processor interface to communication quality.

BACKGROUND

A mobile industry processor interface (MIPI) is widely applied to mobile communications devices, and a standard of an interface with lower power consumption and higher transmission efficiency is provided. According to different transmission requirements for an MIPI interface, an MIPI clock frequency needs to meet different requirements. For example, when the MIPI is used on a liquid crystal display (LCD), the MIPI clock frequency needs to be greater than a specific frequency, so as to meet a requirement of an LCD update rate.

As operating frequency bands of a current communications device increase, an MIPI clock frequency causes interference to a communication radio frequency in an actual communication process, and consequently, communication receiver sensitivity decreases. To avoid such interference, after the communications device is switched on, during initialization of an MIPI module, the MIPI module selects, by means of screening according to a current radio frequency band used by the communications device, a clock frequency causing minimum interference to the radio frequency band from MIPI clock frequencies that can meet a requirement of the device, and configures the frequency in an MIPI hardware register as a static value, so as to complete configuration of the MIPI clock frequency.

A communication environment in which a mobile communications device is located may change, and therefore, a radio frequency band of the device also changes, so as to match the communication environment in which the device is located. Therefore, an originally configured MIPI clock frequency causing no interference to the radio frequency band may cause interference to a changed radio frequency band, thereby affecting communication quality of the communications device.

SUMMARY

In view of the above, embodiments of the present invention provide a mobile industry processor interface MIPI clock frequency configuration method and apparatus, so as to reduce interference from MIPI switching to communication of a device, and improve communication quality and stability of the device.

According to a first aspect, an embodiment of the present invention provides a mobile industry processor interface MIPI clock frequency configuration method. When a radio frequency band used by a device on which an MIPI is located changes, an MIPI clock frequency is determined according to radio frequency band information, where the radio frequency band information includes the radio frequency band currently used by the device, and the determined MIPI clock frequency causes no interference to the radio frequency band currently used by the device; and an MIPI clock frequency of the device is configured as the determined MIPI clock frequency.

With reference to the first aspect, in a first implementation manner, it may be determined whether a display screen of the device is turned on; and if the display screen is turned on, the MIPI clock frequency of the device is configured as the determined MIPI clock frequency.

With reference to the first aspect, in a second implementation manner, whether the MIPI is in an idle state is determined; and if the MIPI is in an idle state, the MIPI clock frequency is configured as the determined MIPI clock frequency.

With reference to any one of the first aspect, or the first to the second implementation manners of the first aspect, in a third implementation manner, when the MIPI clock frequency is being determined according to the radio frequency band information, it is determined, according to the radio frequency band currently used by the device and a preset correspondence, that the MIPI clock frequency is an MIPI clock frequency causing interference of a lowest level to the radio frequency band currently used by the device. The correspondence includes levels of interference from different MIPI clock frequencies to the radio frequency band currently used by the device.

With reference to any one of the first aspect, or the first to the second implementation manners of the first aspect, in a fourth implementation manner, when the MIPI clock frequency is being determined according to the radio frequency band information, MIPI clock frequencies causing interference of levels lower than a preset threshold to the radio frequency band currently used by the device are determined according to the radio frequency band currently used by the device and a preset correspondence, where the correspondence includes levels of interference from different MIPI clock frequencies to the radio frequency band currently used by the device; and the MIPI clock frequency is determined from the MIPI clock frequencies causing the interference of levels lower than the preset threshold to the radio frequency band currently used by the device.

With reference to the third implementation manner of the first aspect, in a fifth implementation manner, when the MIPI clock frequency is being determined from the MIPI clock frequencies causing the interference of levels lower than the preset threshold to the radio frequency band currently used by the device, it is determined, according to the preset correspondence, that an MIPI clock frequency causing interference of a level lower than the preset threshold to a largest quantity of radio frequency bands is the to-be-determined MIPI clock frequency.

With reference to the third implementation manner of the first aspect, in a sixth implementation manner, the radio frequency band information further includes a radio frequency band of a neighboring cell of a serving cell in which the device is currently located; and when the MIPI clock frequency is being determined from the MIPI clock frequencies causing the interference of levels lower than the preset threshold to the radio frequency band currently used by the device, according to the radio frequency band of the neighboring cell of the serving cell in which the device is currently located, the MIPI clock frequency is determined from the MIPI clock frequencies causing the interference of levels lower than the preset threshold to the radio frequency band currently used by the device.

With reference to the sixth implementation manner of the first aspect, in a seventh implementation manner, from the MIPI clock frequencies causing the interference of levels lower than the preset threshold to the radio frequency band currently used by the device and according to radio frequency band information of the neighboring cell and the preset correspondence, an MIPI clock frequency causing interference of a level lower than the preset threshold to a largest quantity of radio frequency bands of the neighboring cell is selected as the to-be-determined MIPI clock frequency.

With reference to any one of the first aspect, or the first to the seventh implementation manners of the first aspect, in an eighth implementation manner, it is determined whether the current MIPI clock frequency of the device is different from the determined MIPI clock frequency, and if the current MIPI clock frequency of the device is different from the determined MIPI clock frequency, the MIPI clock frequency of the device is configured as the determined MIPI clock frequency.

According to a second aspect, an embodiment of the present invention provides a mobile industry processor interface MIPI clock frequency configuration apparatus. The apparatus includes a radio frequency band aggregation module, an MIPI clock frequency screening module, and an MIPI clock frequency control module. The apparatus may be configured to execute the method in the first aspect and various implementation manners of the first aspect.

According to a third aspect, the present invention further provides a communications device. The communications device includes a processor and a memory connected to the processor. The processor invokes an instruction stored in the memory, so as to execute the method in the first aspect and various implementation manners of the first aspect.

It can be learned that in the embodiments of the present invention, current radio frequency band information of a device is obtained, the radio frequency band information is reported when a current radio frequency band of the device changes, an MIPI clock frequency causing no interference to the current radio frequency band of the device is further selected by means of screening, and an MIPI clock frequency of the device is changed to the MIPI clock frequency causing no interference. This ensures that when a current radio frequency of the device changes, the MIPI clock frequency currently used by the device causes no interference to the radio frequency, thereby improving communication quality of a communications device.

In addition, switching is performed only when the device is in a screen-on state, or switching is performed only when the MIPI clock frequency selected by means of screening is different from the MIPI clock frequency used by the device, or screening is performed only after a specific time interval, so that a quantity of times for screening or switching an MIPI clock frequency is reduced. This saves system resources, and reduces power consumption of the communications device.

In addition, switching is performed only when an MIPI is in an idle state, or when an EDC is in a blanking zone, thereby reducing impact caused by MIPI switching on a display effect of a display screen, and improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method for reducing interference from a mobile industry processor interface MIPI to communication quality, so that when a radio frequency band of a device changes, an MIPI clock frequency causes no interference to communication of the device, thereby improving communication quality and stability of the device.

The present invention further provides corresponding communications devices, which are separately described in detail below.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

For ease of understanding the embodiments of the present invention, terms used in description of the embodiments of the present invention are first described herein.

A radio frequency band refers to a frequency band, of a radio frequency signal, used by a communications device for performing wireless communication. The radio frequency band is determined by a base station device in a serving cell in which the communications device is currently located. Therefore, when the communications device is located in different serving cells, a radio frequency band of the communications device may change. In addition, the communications device has multiple communications modes, such as Global System for Mobile Communications (GSM), Code Division Multiple Access (CDMA), Wideband Code Division Multiple Access(WCDMA), Time Division-Synchronous Code Division Multiple Access (TDSCDMA), and Long Term Evolution (LTE). Different radio frequency bands are used in different communications modes. Information including a radio frequency band is referred to as radio frequency band information.

Figure 1:
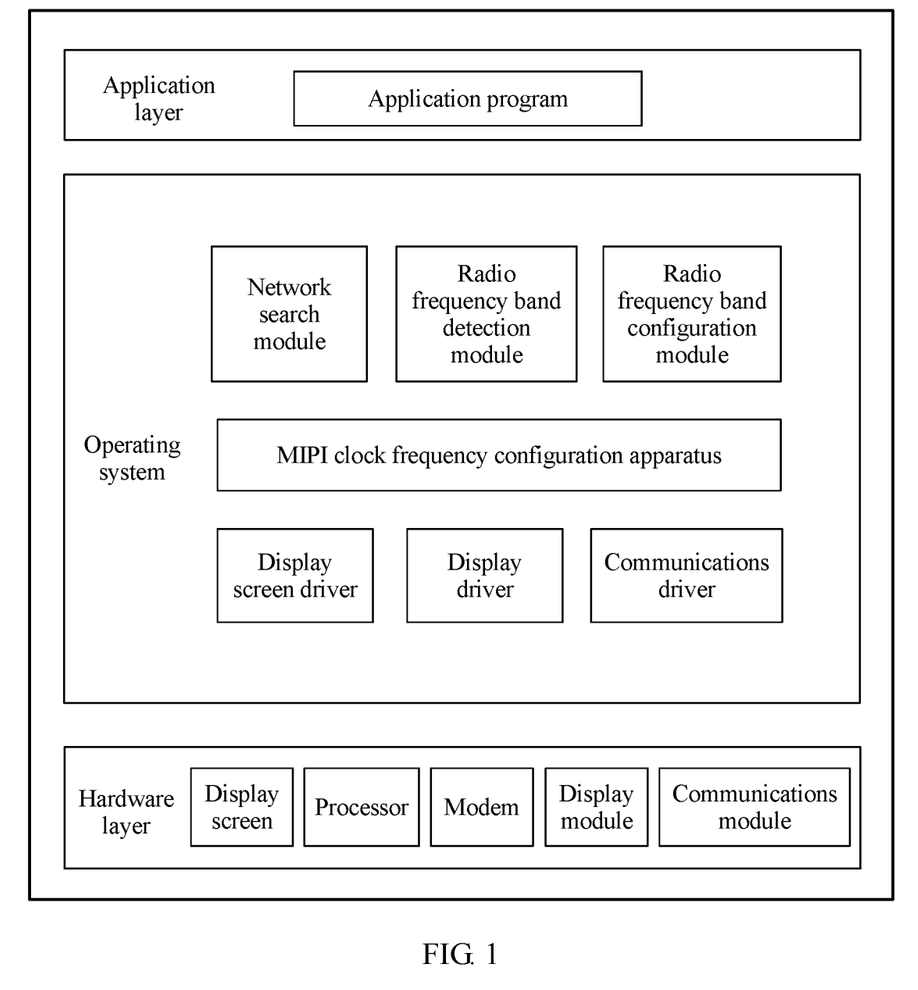
FIG. 1 is a schematic diagram of a logical structure of a communications device according to an embodiment of the present invention.

Referring to FIG. 1, FIG. 1 is a schematic diagram of a logical structure of a communications device according to an embodiment of the present invention.

FIG. 1 is used as an example to describe a logical structure of a communications device to which a method for reducing interference from an MIPI to communication quality provided in an embodiment of the present invention is applied. Specifically, the communications device may be a mobile phone, or another communications device with a display screen. As shown in FIG. 1, a hardware layer of the communications device includes a display screen, various processors (including an application processor, a communications processor, an image processor, and the like), a modem, a display module (including an MIPI interface, an enhanced display controller (EDC), and the like), a communications module, and the like. An operating system and some application programs may run at the hardware layer.

The operating system includes various drivers related to the present invention, such as a display driver (that is, various drivers used by the display module), a display screen driver, and a communications driver. The operating system further includes: a communication network search module, used by the device to search for a radio frequency band in a current network environment; a radio frequency band detection module, configured to detect whether a current radio frequency band of the device matches the radio frequency band in the network environment; and a radio frequency band configuration module, configured to configure a radio frequency band matching the radio frequency band in the current network environment.

In the present invention, an MIPI clock frequency configuration apparatus is added in the operating system, and is configured to: select, by means of screening, an MIPI clock frequency that meets a condition, and configure the MIPI clock frequency.

Figure 2:
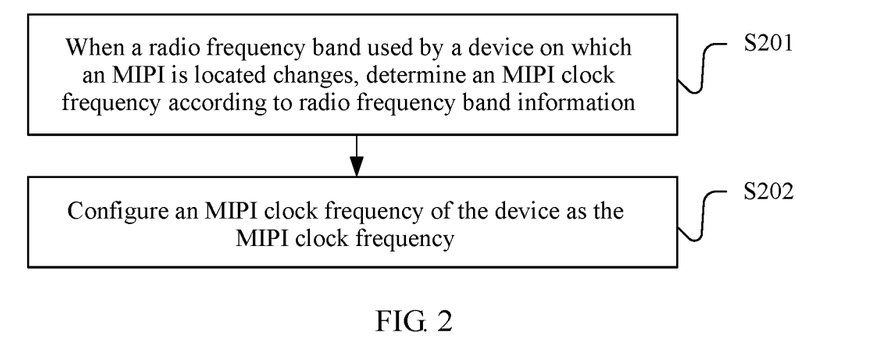
FIG. 2 is a schematic flowchart of a method for reducing interference from an MIPI to communication quality according to an embodiment of the present invention.

Referring to FIG. 2, FIG. 2 is a schematic flowchart of a method for reducing interference from an MIPI to communication quality according to an embodiment of the present invention. It should be noted that the method in this embodiment is applied to a communications device, and the communications device includes a display screen and a communications module. The method in this embodiment of the present invention may include the following steps.

S201. When a radio frequency band used by a device on which an MIPI is located changes, determine an MIPI clock frequency according to radio frequency band information, where the radio frequency band information includes the radio frequency band currently used by the device, and the determined MIPI clock frequency causes no interference to the radio frequency band currently used by the device.

That the radio frequency band of the device changes means that a radio frequency band used by the device for communication is switched, so as to maintain normal communication with a base station device that provides a network. Because base station devices in different serving cells use different radio frequency bands, the communications device needs to use a same radio frequency band as that used by the base station device, so as to maintain normal wireless communication with the base station device. Therefore, when a serving cell changes, the radio frequency band of the communications device may change.

Whether a radio frequency band changes is determined in one possible implementation manner: A current radio frequency band of a serving cell is periodically reported, and whether the radio frequency band changes is further determined according to whether a radio frequency band reported this time is the same as a radio frequency band reported last time, Whether a radio frequency band changes is determined in another possible implementation manner: Switching information is reported when a radio frequency of a device is switched, and the switching information includes a switched radio frequency; and when the switching information is received, it may be determined that a radio frequency band changes.

In a specific implementation manner, each access stratum (AS) may periodically obtain a radio frequency band of a current serving cell of each network module according to a status of a current wireless environment, and report radio frequency band information to machine type communication (MTC) module; or when the wireless environment changes, that is, when the radio frequency band is switched, report radio frequency band information of the current serving cell to MTC module.

By means of experiment, it may be found that different MIPI clock frequencies cause different levels of interference to different radio frequency bands. An MIPI clock frequency causes different interference to different frequencies on a radio frequency band. Because a communications device uses multiple radio frequencies on the radio frequency band, a level of interference from the MIPI clock frequency to the radio frequency band refers to a maximum value of levels of interference from the MIPI clock frequency to all radio frequencies on the radio frequency band.

TABLE 1

| | B20 731-821 | B5 869-894 | B8 925-960 | B3 1805-1880 | B39 1880-1920 | B2 1930-1990 | B34 2010-2025 | B1 2110-2170 | B40 2300-2400 |
|---|---|---|---|---|---|---|---|---|---|
| 486.4 | | | | 1824 (6 db) | | 1945.6 (10 db) | | | 2310.4 (7 db) |
| 499.2 | | 873.6 (5 db) | | 1872 (6 db) | | | | 2121.6 (7 db) | 2371.2 (7 db) |
| 480 | | | 960 (7 db) | | 1920 (7 db) | | | 2160 (7 db) | 2400 (7 db) |

As shown in Table 1, levels of interference from some MIPI clock frequencies to some radio frequency bands in an experimental environment are listed. In the table, the first row represents different radio frequency bands. For example, B20 is a radio frequency band with frequencies of 731-821 MHz. The first column represents an MIPI clock frequency. For example, 486.4 refers to an MIPI clock frequency of 486.4 MHz. A gray part represents interference from an MIPI clock frequency to a radio frequency band. A number outside brackets represents a specific frequency on a frequency band interfered by an MIPI clock frequency, and a number within the brackets is a level of generated interference. A larger number represents a higher level of interference. For example, 1824 (6 db) in the second row and the fifth column means that when an MIPI clock frequency is 486.4 HMz, interference is caused to a radio frequency of 1824 HMz on a radio frequency band B3 (that is, a radio frequency ranges from 1805 HMz to 1880 HMz), and a level of the interference is 6 db. It can be learned from the table that when a radio frequency band changes, an MIPI clock frequency originally causing no interference to the radio frequency band may cause interference to a changed radio frequency band. For example, when a serving cell in which a device is located uses a radio frequency band B3 (1805-1880 HMz), and the device is switched on, an MIPI clock frequency is set to 480 HMz according to the frequency band, so that the MIPI clock frequency causes no interference to the radio frequency band. When the device moves to another serving cell, the radio frequency band changes to a radio frequency band such as B39 (1880-1920 HMz). In this case, the original MIPI clock frequency 480 HMz causes interference to the radio frequency band, that is, the original MIPI clock frequency 480 HMz causes interference of 7 db to a radio frequency of 1920 HMz. For the changed radio frequency band B39, if the MIPI clock frequency is 499.2 HMz or 486.4 HMz, no interference is caused to the radio frequency band.

In Table 1, a non-gray cell without data means that an MIPI clock frequency corresponding to the cell causes no interference to a radio frequency band corresponding to the cell. It may be understood that there is no absolute non-interference case. Therefore, "no interference" herein means that a level of interference is below a threshold, so that normal communication is not affected by the interference, and the interference can be ignored.

Therefore, the MIPI clock frequency causing no interference to the radio frequency band currently used by the device may be determined according to the radio frequency band information. In an embodiment, a correspondence of levels of interference from an MIPI clock frequency to different radio frequency bands may be prestored in the device according to experimental data, and the MIPI clock frequency causing no interference to the radio frequency band currently used by the device may be obtained by querying the correspondence.

In an implementation manner, it is determined, according to the radio frequency band currently used by the device and a preset correspondence, that the MIPI clock frequency is an MIPI clock frequency causing interference of a lowest level to the radio frequency band currently used by the device. The correspondence includes levels of interference from different MIPI clock frequencies to the radio frequency band currently used by the device. If a level of interference from an MIPI clock frequency to the radio frequency band is lower than a threshold, it is considered that the clock frequency causes no interference to the radio frequency band. Therefore, an MIPI clock frequency causing interference of a level lower than the threshold is selected according to existing experimental data, that is, no interference is caused. In this specific implementation manner, because the MIPI clock frequency causing the interference of a lowest level is selected, impact caused by an MIPI clock frequency on communication can be effectively minimized, thereby ensuring good communication quality.

In another implementation manner, MIPI clock frequencies causing interference of levels lower than a preset threshold to the radio frequency band currently used by the device are determined according to the radio frequency band currently used by the device and a preset correspondence, where the correspondence includes levels of interference from different MIPI clock frequencies to the radio frequency band currently used by the device; and the MIPI clock frequency is determined from the MIPI clock frequencies causing the interference of levels lower than the preset threshold to the radio frequency band currently used by the device. In this implementation manner, instead of an MIPI clock frequency causing interference of a lowest level, the MIPI clock frequencies causing the interference of levels lower than the preset threshold are selected. Generally, there are multiple MIPI clock frequencies causing interference of levels lower than the threshold on a radio frequency band, that is, it is considered that these clock frequencies cause no interference to communication. In this implementation manner, because the MIPI clock frequency may be selected from the multiple MIPI clock frequencies that meet the condition, the MIPI clock frequency can be more flexibly configured.

In a specific implementation manner, a manner of determining the MIPI clock frequency from the MIPI clock frequencies causing the interference of levels lower than the preset threshold to the radio frequency band currently used by the device may be: it is determined, according to the preset correspondence, that an MIPI clock frequency causing interference of a level lower than the preset threshold to a largest quantity of radio frequency bands is the to-be-determined MIPI clock frequency. That is, in this implementation manner, the selected MIPI clock frequency causes interference to neither a current radio frequency band of a cell nor other radio frequency bands as many as possible. Therefore, when the radio frequency band changes again, it is very likely that no interference is caused to a new radio frequency band.

In another specific implementation manner, a manner of determining the MIPI clock frequency from the MIPI clock frequencies causing the interference of levels lower than the preset threshold to the radio frequency band currently used by the device may be: if an MIPI clock frequency currently used by the device exists in the MIPI clock frequencies causing the interference of levels lower than the preset threshold to the radio frequency band currently used by the device, it is determined that the MIPI clock frequency currently used by the device is the to-be-determined MIPI clock frequency. In this implementation manner, no interference is caused to the radio frequency band currently used by the device, and the MIPI clock frequency currently used by the device is used as much as possible, so that a quantity of times for switching an MIPI clock frequency can be reduced, and performance and power consumption costs can be reduced.

In addition to information about the radio frequency band currently used by the device, the radio frequency band information further includes radio frequency band information of a neighboring cell of a serving cell in which the device is currently located. In this case, according to the radio frequency band of the neighboring cell, the MIPI clock frequency may be determined from the MIPI clock frequencies causing the interference of levels lower than the preset threshold to the radio frequency band currently used by the device. For example, radio frequency bands of a neighboring cell may be sequenced according to energy strength of the radio frequency bands, and an MIPI clock frequency causing no interference to a radio frequency bands, of a neighboring cell, whose energy strength ranks high is selected from MIPI clock frequencies causing no interference to the radio frequency band currently used by the device. In this case, the determined MIPI clock frequency causes interference to neither the radio frequency band currently used by the device nor a radio frequency band, with relatively high strength, of the neighboring cell. Neighboring cells with high strength are generally close to each other, and therefore, it is more likely that the device moves to the neighboring cell, and the determined MIPI clock frequency has relatively good adaptability to the neighboring cell.

For another example, an MIPI clock frequency causing no interference to a radio frequency band that is of a cell and that has been used by a device in a neighboring cell may be preferentially selected. In this case, because no interference is caused to the radio frequency band that is of the cell and that has been used by the device, it is more likely that the device enters a range of the serving cell again for use.

Alternatively, in a specific implementation manner, from the MIPI clock frequencies causing the interference of levels lower than the preset threshold to the radio frequency band currently used by the device and according to the radio frequency band information of the neighboring cell and the preset correspondence, an MIPI clock frequency causing interference of a level lower than the preset threshold to a largest quantity of radio frequency bands of the neighboring cell is selected as the to-be-determined MIPI clock frequency. For example, with reference to FIG. 3, if a current radio frequency band of a cell is B20, MIPI clock frequencies 486.4, 499.2 and 480 cause no interference to B20. If radio frequency bands of a neighboring cell are B8, B3, B39, and B2, for the radio frequency bands of the neighboring cells, both the MIPI clock frequency 486.4 and the MIPI clock frequency 480 cause interference to two of the radio frequency bands, and the MIPI clock frequency 499.2 causes interference to only one radio frequency band. Therefore, the MIPI clock frequency 499.2 is selected as the to-be-determined MIPI clock frequency. In this implementation manner, the determined MIPI clock frequency causes interference to neither the radio frequency band currently used by the device nor radio frequency bands of the neighboring cell as many as possible. Therefore, when the device moves to the neighboring cell, it is very likely that the determined MIPI clock frequency causes no interference to the radio frequency band of the neighboring cell. Therefore, adaptability of the determined MIPI clock frequency is improved.

S202. Configure an MIPI clock frequency of the device as the MIPI clock frequency.

After the MIPI clock frequency causing no interference to the radio frequency band currently used by the device is determined, the MIPI clock frequency of the device is switched to the MIPI clock frequency causing no interference, so as to reduce interference from an MIPI clock frequency to communication quality of the communications device.

In an implementation manner of S202, the MIPI clock frequency may be configured in an MIPI hardware registry, so that a display screen works according to a new MIPI clock frequency after configuration.

Optionally, in an implementation manner, the current MIPI clock frequency of the device is switched to the MIPI clock frequency only when the device is in a screen-on state. The screen-on state means that a display screen is powered on and is in a working status, and an ACPU, an MIPI module and the like of the device are also powered on and are in a working status. Therefore, when the device is in a screen-on state, the MIPI module works according to the MIPI clock frequency, and the MIPI clock frequency may cause interference to communication in this case; or when the device is in a screen-off state, that is, neither the display screen nor the MIPI module is powered on, the MIPI clock frequency causes no interference to a radio frequency. In this implementation manner, the MIPI clock frequency is not switched when the MIPI is not working, thereby reducing impact caused by clock frequency switching on power consumption and performance.

Optionally, in another implementation manner, the current MIPI clock frequency of the device is switched to the MIPI clock frequency when the MIPI is in an idle state. When the MIPI is in an idle state, although an MIPI module is in a working status, no data is transmitted by using the MIPI. Therefore, the MIPI clock frequency is switched in this case, thereby minimizing impact caused by MIPI clock frequency switching on a displayed effect.

For example, when an enhanced display controller EDC is in a blanking zone, the MIPI is in an idle state. The EDC has horizontal and longitudinal blanking zones, and configuration of these blanking zones is the same as a configuration value of a display screen currently used by a mobile phone, that is, the configuration value is provided by a display screen module provider. When the EDC is in a blanking zone, that is, no data is transmitted by using the MIPI in the blanking zone when the MIPI is in an idle state. Therefore, this section of the blanking zone may be used to dynamically switch the MIPI clock frequency. Specifically, a hardware interrupt report indicating completion of transmission of effective data is added to the EDC module. After the interruption report is received, it indicates that the EDC is currently in a blanking zone. In this case, no data is transmitted by using the MIPI, and the MIPI clock frequency may be switched.

Optionally, in an implementation manner, that the current MIPI clock frequency of the device is switched to the MIPI clock frequency includes: it is determined whether the current MIPI clock frequency of the device is different from the MIPI clock frequency, and if the current MIPI clock frequency of the device is different from the MIPI clock frequency, the current MIPI clock frequency of the device is switched to the MIPI clock frequency. In this implementation manner, the MIPI clock frequency is switched only when the current MIPI clock frequency of the device is different from the determined MIPI clock frequency causing no interference to communication, thereby reducing a quantity of switching times, and reducing impact on performance and power consumption caused by MIPI clock frequency switching.

Figure 3:
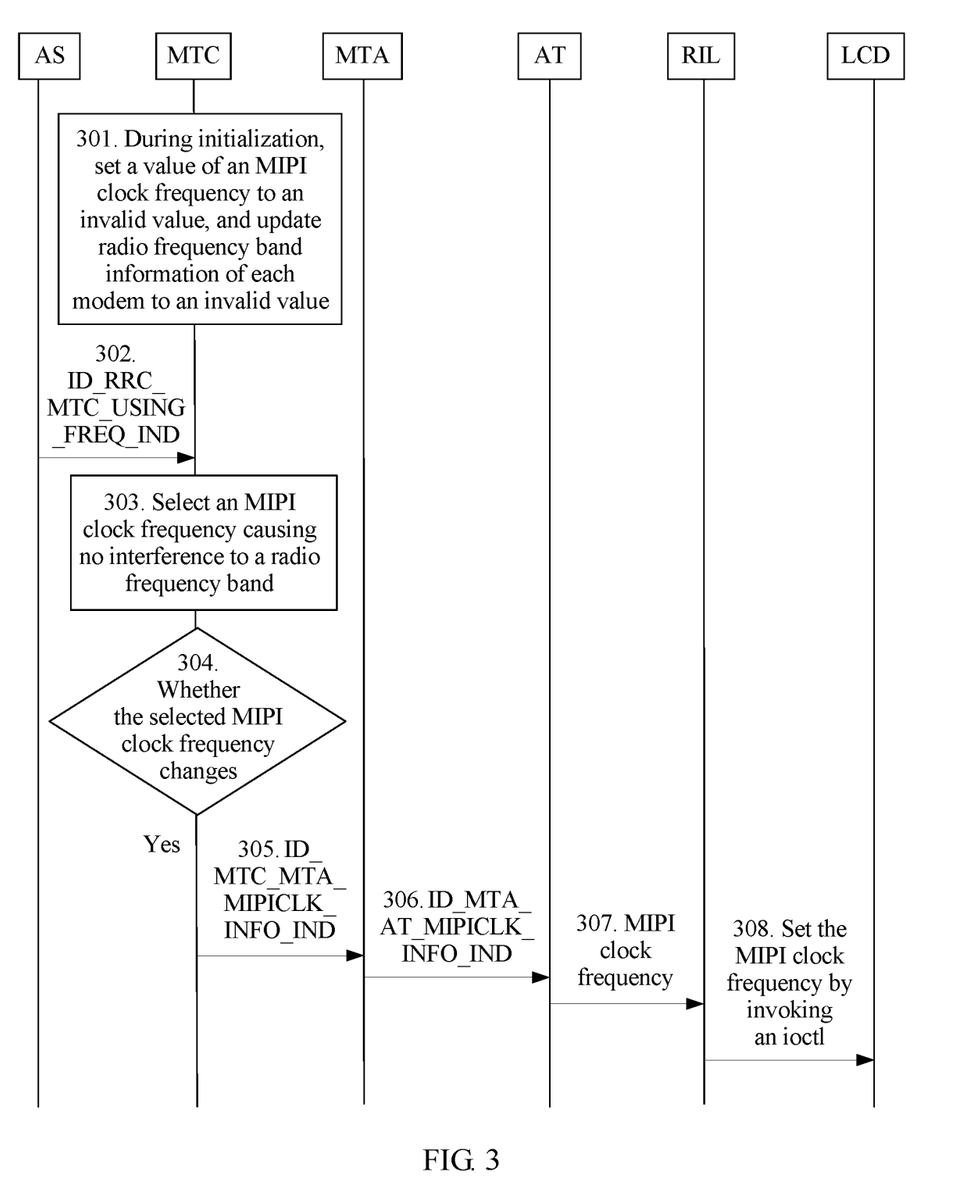
FIG. 3 is a schematic flowchart of executing the method by various modules of a smartphone according to an embodiment of the present invention.

With reference to FIG. 3, the following describes a specific implementation manner of this embodiment by using a smartphone as the communications device for executing the method.

Because multiple modules of the mobile phone are involved when the smartphone performs communication and displaying, modules related to the technology of the present invention are mainly an access stratum and a non-access stratum (NAS) in a communications module, and an MIPI module. Correspondingly, these modules need to learn a current radio frequency band of the device, and then select an MIPI clock frequency causing no interference to the radio frequency band. Specific implementation is as follows:

The access stratus reports a radio frequency band of a serving cell to MTC module, and further reports a frequency of frequency hopping to the MTC module when a GSM network is used as a dominant module. Preferably, the AS may further collect a radio frequency band of a neighboring cell and report the radio frequency band to the MTC module.

In the non-access stratum NAS, after receiving the radio frequency band that is of the serving cell and that is reported by the access stratus, the MTC module selects, by querying a preset table of levels of interference from an MIPI clock frequency to different radio frequency bands, an MIPI clock frequency causing no interference to the radio frequency band, and reports the MIPI clock frequency to a radio interface layer (RIL). After receiving the reported MIPI clock frequency, the RIL invokes a system call interface provided by an EDC module at a kernel layer, to deliver the MIPI clock frequency to the MIPI module.

As shown in FIG. 3, specific procedures of the foregoing steps are as follows:

301. During initialization, MTC module sets a value of an MIPI clock frequency to an invalid value, and updates radio frequency band information of each modem to an invalid value.

302. Each access stratum reports the radio frequency band information by using an ID_RRC_MTC_USING_FREQ_IND message, and preferably, the radio frequency band information further includes a radio frequency band of a neighboring cell.

303. Select an MIPI clock frequency causing no interference to a radio frequency band of a current serving cell, and preferably, select, from MIPI clock frequencies causing no interference to the current serving cell, an MIPI clock frequency causing no interference to more neighboring serving cells or a closest neighboring serving cell.

304. Determine, according to a calculation result, whether an MIPI clock frequency obtained by calculation changes compared with a current MIPI clock frequency, and if the MIPI clock frequency obtained by calculation does not change, end the procedure; or if the MIPI clock frequency obtained by calculation changes, go to step 305.

305. The MTC module sends an ID_MTC_MTA_MIPI-CLK_INFO_IND message to an MTA module.

306. The MTA module sends an ID_MTA_AT_MIPI-CLK_INFO_IND message to an AT interface.

307. The AT reports the MIPI clock frequency to a RIL.

308. The RIL sets the MIPI clock frequency by invoking an ioctl interface.

After learning a frequency to which the current MIPI clock frequency needs to be switched, an MIPI module needs to configure the MIPI clock frequency in an MIPI hardware registry, so that an LCD subsequently displays data according to the clock frequency. Specifically, the MIPI clock frequency that is set by the RIL by using the ioctl interface is stored in a DDR. After receiving the MIPI clock frequency that needs to be configured, the MIPI module calculates a series of values that are related to the clock frequency and that need to be configured in the MIPI register, and stores, in a predefined array, these values that need to be reconfigured; and detects an interrupt report indicating completion of transmission of data reported by an EDC module, and after the interrupt report is received, that is, the EDC is in a blanking zone, determines whether the current MIPI clock frequency needs to be switched. A determining condition is: whether the currently used MIPI clock frequency is the same as the MIPI clock frequency that needs to be switched to. If the currently used MIPI clock frequency is the same as the MIPI clock frequency that needs to be switched to, it is considered that the currently used MIPI clock frequency does not need to be switched. If the currently used MIPI clock frequency is different from the MIPI clock frequency that needs to be switched to, the values that need to be configured in the MIPI register and that are stored in the array need to be configured in a corresponding MIPI register, to complete switching of the MIPI clock frequency.

It can be learned that in this embodiment of the present invention, current radio frequency band information of a device is obtained, the radio frequency band information is reported when a current radio frequency band of the device changes, an MIPI clock frequency causing no interference to the current radio frequency band of the device is further selected by means of screening, and an MIPI clock frequency of the device is changed to the MIPI clock frequency causing no interference. This ensures that when a current radio frequency of the device changes, the MIPI clock frequency currently used by the device causes no interference to the radio frequency, thereby improving communication quality of a communications device.

In addition, switching is performed only when the device is in a screen-on state, or switching is performed only when the MIPI clock frequency selected by means of screening is different from the MIPI clock frequency used by the device, or screening is performed only after a specific time interval, or the MIPI clock frequency selected by means of screening causes no interference to a neighboring cell as far as possible, so that a quantity of times for screening or switching an MIPI clock frequency is reduced. This saves system resources, and reduces power consumption of the communications device.

In addition, switching is performed only when an MIPI is in an idle state, or when an EDC is in a blanking zone, thereby reducing impact caused by MIPI switching on a display effect of a display screen, and improving user experience.

Figure 4:
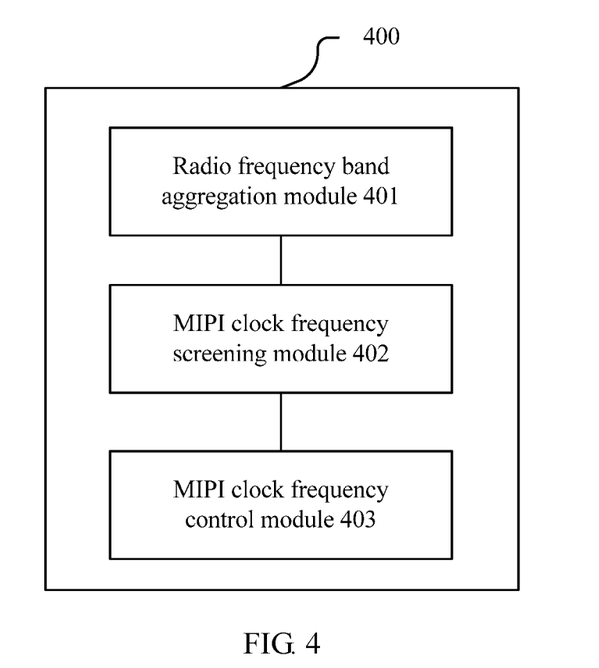
FIG. 4 is a schematic structural diagram of a communications device according to an embodiment of the present invention.

With reference to FIG. 4, FIG. 4 is a schematic structural diagram of a communications device 400 for reducing interference from an MIPI to communication quality according to an embodiment of the present invention. The device may be configured to execute the method or a part of the method in the foregoing method embodiment. Therefore, the terms, concepts, or explanations described in the foregoing embodiment are not repeatedly described in this embodiment. The device includes:

a radio frequency band aggregation module 401, configured to: obtain current radio frequency band information of a device, and when a current radio frequency band of the device changes, transmit the radio frequency band information to an MIPI clock frequency screening module 402, where the radio frequency band information includes information about the radio frequency band currently used by the device;

the MIPI clock frequency screening module 402, configured to: obtain the radio frequency band information transmitted by the radio frequency band aggregation module, and determine an MIPI clock frequency according to the radio frequency band information, where the MIPI clock frequency causes no interference to the radio frequency band currently used by the device; and transmit the MIPI clock frequency to an MIPI clock frequency control module; and the MIPI clock frequency control module 403, configured to: receive the MIPI clock frequency transmitted by the MIPI clock frequency screening module, and configure an MIPI clock frequency of the device as the determined MIPI clock frequency.

Referring to the foregoing method embodiment, the MIPI clock frequency screening module 402 may further determine the MIPI clock frequency in the following optional implementation manners:

Optionally, according to the radio frequency band information, by querying a preset correspondence table of levels of interference from an MIPI clock frequency to different radio frequency bands, it is determined that the determined MIPI clock frequency is an MIPI clock frequency causing interference of a lowest level to the radio frequency band currently used by the device.

Optionally, according to the radio frequency band information, by querying a preset correspondence table of levels of interference from an MIPI clock frequency to different radio frequency bands, MIPI clock frequencies causing interference of levels lower than a preset threshold to the radio frequency band currently used by the device are selected; and the MIPI clock frequency is determined from the MIPI clock frequencies causing the interference of levels lower than the preset threshold to the radio frequency band currently used by the device.

Optionally, by querying the preset correspondence table of levels of interference from an MIPI clock frequency to different radio frequency bands, in the MIPI clock frequencies causing the interference of levels lower than the preset threshold to the radio frequency band currently used by the device, an MIPI clock frequency causing interference of a level lower than the preset threshold to a largest quantity of radio frequency bands is determined as the to-be-determined MIPI clock frequency.

Optionally, if the MIPI clock frequency currently used by the device exists in the MIPI clock frequencies causing the interference of levels lower than the preset threshold to the radio frequency band currently used by the device, the MIPI clock frequency currently used by the device is the to-be-determined MIPI clock frequency.

Optionally, in addition to information about the radio frequency band currently used by the device, the radio frequency band information further includes radio frequency band information of a neighboring cell of a serving cell in which the device is currently located. According to the radio frequency band of the neighboring cell of the serving cell in which the device is currently located, the MIPI clock frequency is determined from the MIPI clock frequencies causing the interference of levels lower than the preset threshold to the radio frequency band currently used by the device.

Optionally, according to the radio frequency band information of the neighboring cell, by querying the preset table of levels of interference from an MIPI clock frequency to different radio frequency bands, an MIPI clock frequency causing interference of a level lower than the preset threshold to a largest quantity of radio frequency bands of the neighboring cell is selected, as the to-be-determined MIPI clock frequency, from the MIPI clock frequencies causing the interference of levels lower than the preset threshold to the radio frequency band currently used by the device.

Optionally, after determining the MIPI clock frequency, the MIPI clock frequency screening module 402 is further configured to: determine whether the MIPI clock frequency is the same as the MIPI clock frequency currently used by the device, and if the MIPI clock frequency is different from the MIPI clock frequency currently used by the device, transmit the MIPI clock frequency to the MIPI clock frequency control module.

Optionally, after receiving the MIPI clock frequency transmitted by the MIPI clock frequency screening module, the MIPI clock frequency control module 403 is further configured to: determine whether the MIPI clock frequency is the same as the MIPI clock frequency currently used by the device, and if the MIPI clock frequency is different from the MIPI clock frequency currently used by the device, switch the current MIPI clock frequency of the device to the MIPI clock frequency.

The MIPI clock frequency control module is configured to: receive the MIPI clock frequency transmitted by the MIPI clock frequency screening module, and switch the current MIPI clock frequency of the device to the MIPI clock frequency.

With reference to the foregoing method embodiment, the MIPI clock frequency control module may further switch the current MIPI clock frequency of the device in the following optional implementation manners:

Optionally, when the device is currently in a screen-on state, the current MIPI clock frequency of the device is switched to the MIPI clock frequency.

Optionally, when the MIPI is in an idle state, the current MIPI clock frequency of the device is switched to the MIPI clock frequency.

Preferably, when an enhanced display controller EDC is in a blanking zone, the MIPI is in an idle state.

With reference to the foregoing description in the embodiment corresponding to FIG. 3, an AS may execute a function of the radio frequency band aggregation module in this embodiment, an NAS (including an MTC module, an MTA module, and an AT module) may implement a function of the clock frequency screening module in this embodiment, and an RIL interface and an EDC module may implement a function of the MIPI clock frequency control module in this embodiment.

In specific implementation, the modules in this embodiment may be encapsulated in a same processing chip or different processing chips, and the encapsulated chip can implement interaction with another related module of the device. A processing chip in which the radio frequency band aggregation module 401 is located may interact with a radio frequency band configuration module of the device, to obtain a radio frequency band configured by the radio frequency band configuration module. The MIPI clock frequency control module 403 can control a display driver of the device, to switch an MIPI clock frequency.

Figure 5:
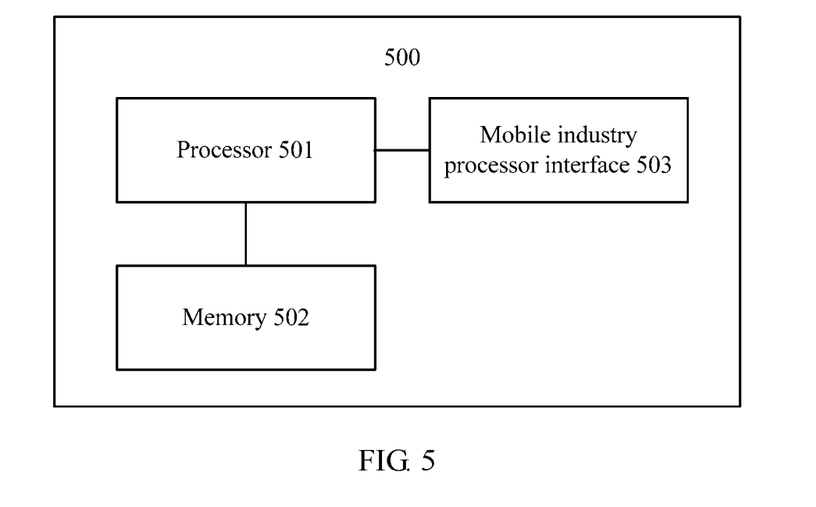
FIG. 5 is a schematic structural diagram of another communications device according to an embodiment of the present invention.

Referring to FIG. 5, FIG. 5 is a schematic structural diagram of a communications device 500 according to an embodiment of the present invention. The communications device includes a processor 501, a memory 502, and a mobile industry processor interface MIPI 503. The memory is configured to store a computer program. By reading the computer program, the processor is configured to: when a radio frequency band used by the communications device changes, determine an MIPI clock frequency according to radio frequency band information, where the radio frequency band information includes the radio frequency band currently used by the device, and the determined MIPI clock frequency causes no interference to the radio frequency band currently used by the device; and configure an MIPI clock frequency of the communications device as the determined MIPI clock frequency.

It should be noted that the memory may include a read-only memory and a random access memory, and provide an instruction and data for the processor. A part of the memory may further include a nonvolatile random access memory (NVRAM).

In some implementation manners, the memory stores the following elements: an executable module or a data structure, or a subset thereof, or an extended set thereof; an operating system, including various system programs such as a communication layer and a driver layer, which are used to implement various basic services and process hardware-based tasks; and various application programs.

Optionally, when configuring the MIPI clock frequency of the device as the determined MIPI clock frequency, by reading the computer program, the processor is specifically configured to: determine whether a display screen of the device is turned on; and if the display screen is turned on, configure the MIPI clock frequency of the device as the determined MIPI clock frequency. Alternatively, in another implementation manner, whether the MIPI is in an idle state is determined; and if the MIPI is in an idle state, the MIPI clock frequency is configured as the determined MIPI clock frequency.

Optionally, when determining the MIPI clock frequency according to the radio frequency band information, by reading the computer program, the processor is specifically configured to: determine, according to the radio frequency band currently used by the device and a preset correspondence, that the MIPI clock frequency is an MIPI clock frequency causing interference of a lowest level to the radio frequency band currently used by the device. The correspondence includes levels of interference from different MIPI clock frequencies to the radio frequency band currently used by the device.

In an implementation manner, when determining the MIPI clock frequency according to the radio frequency band information, by reading the computer program, the processor is specifically configured to: determine, according to the radio frequency band currently used by the device and a preset correspondence, MIPI clock frequencies causing interference of levels lower than a preset threshold to the radio frequency band currently used by the device, where the correspondence includes levels of interference from different MIPI clock frequencies to the radio frequency band currently used by the device; and determine the MIPI clock frequency from the MIPI clock frequencies causing the interference of levels lower than the preset threshold to the radio frequency band currently used by the device; or determine, according to the preset correspondence, that an MIPI clock frequency causing interference of a level lower than the preset threshold to a largest quantity of radio frequency bands is the to-be-determined MIPI clock frequency.

In another implementation manner, the radio frequency band information further includes a radio frequency band of a neighboring cell of a serving cell in which the device is currently located. When determining the MIPI clock frequency from the MIPI clock frequencies causing the interference of levels lower than the preset threshold to the radio frequency band currently used by the device, by reading the computer program, the processor is specifically configured to: determine, according to the radio frequency band of the neighboring cell of the serving cell in which the device is currently located, the MIPI clock frequency from the MIPI clock frequencies causing the interference of levels lower than the preset threshold to the radio frequency band currently used by the device; or select, from the MIPI clock frequencies causing the interference of levels lower than the preset threshold to the radio frequency band currently used by the device and according to radio frequency band information of the neighboring cell and the preset correspondence, an MIPI clock frequency causing interference of a level lower than the preset threshold to a largest quantity of radio frequency bands of the neighboring cell as the to-be-determined MIPI clock frequency.

Optionally, when switching the current MIPI clock frequency of the device to the MIPI clock frequency, by reading the computer program, the processor is specifically configured to: determine whether the current MIPI clock frequency of the device is different from the determined MIPI clock frequency, and if the current MIPI clock frequency of the device is different from the determined MIPI clock frequency, configure the MIPI clock frequency of the device as the determined MIPI clock frequency.

The following describes a specific implementation manner of the device by using an example in which the device is a smartphone. The smartphone is corresponding to the communications device 500 in the foregoing embodiment, and the processor 501 includes a processor for processing an image display task (ACPU for short) and a processor for processing a communication task (CCPU for short). Certainly, the ACPU or the CCPU may integrate one single processing chip, or may integrate multiple processing chips. Therefore, the modules of the communications device 400 in the foregoing embodiment may be implemented by the smartphone in the following manners.

Figure 6:
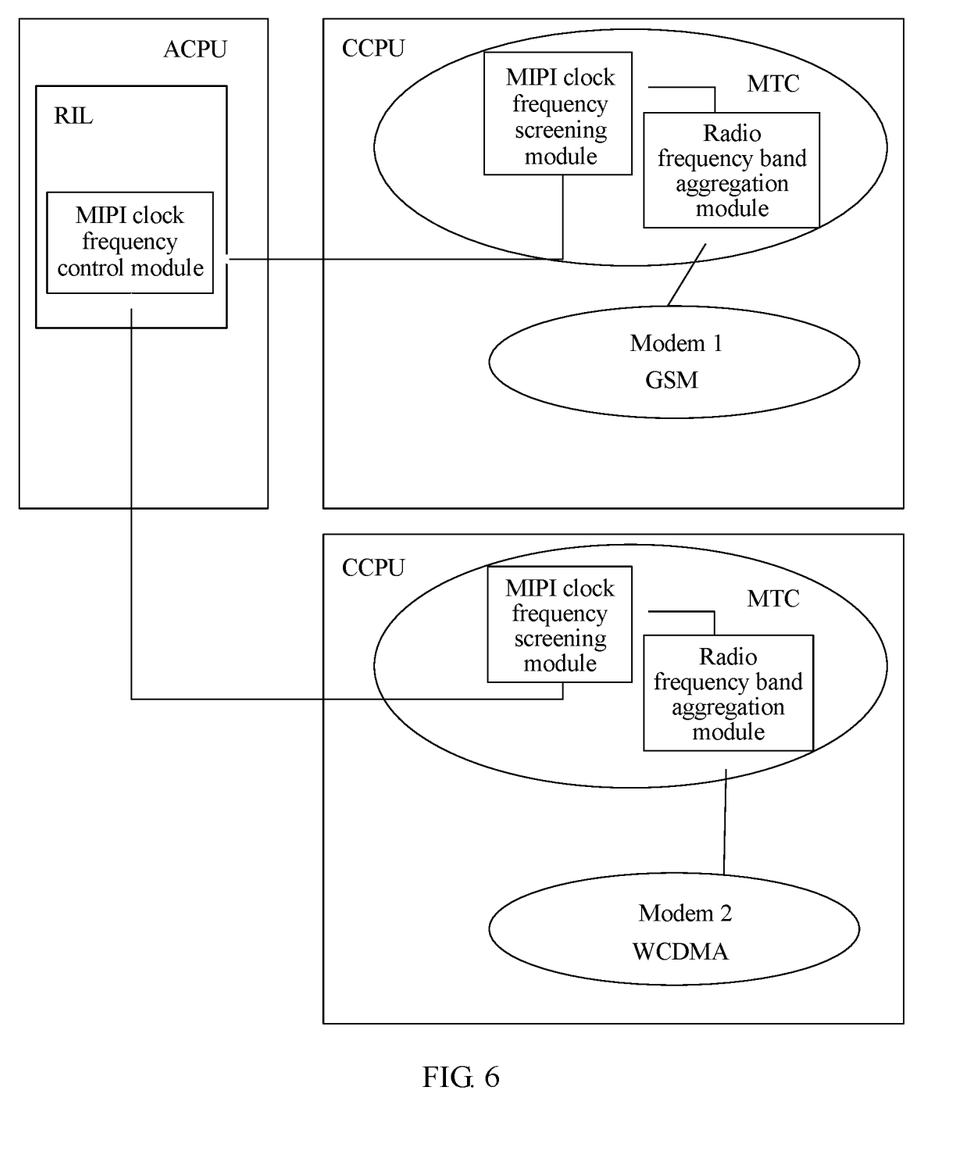
FIG. 6 is a schematic structural diagram of still another communications device according to an embodiment of the present invention.

With reference to FIG. 6, FIG. 6 is an implementation manner applied to the smartphone according to an embodiment. The CCPU integrates the radio frequency band aggregation module 401 and the MIPI clock frequency screening module 402, and the ACPU integrates the MIPI clock frequency control module 403.

If there are multiple communications modes, different communications modes may be corresponding to different CCPUs. In this case, different CCPUs may integrate different radio frequency band aggregation modules 401 and different MIPI clock frequency screening modules 402.

In different communications modes, a modem needs to report a status of a current wireless environment. For example, a modem 1 and a modem 2 respectively report information about radio frequency bands currently used by a device in a GSM network mode and a WCDMA network mode. Preferably, radio frequency band information of a neighboring cell further needs to be reported.

The radio frequency band aggregation module 401 in an MTC module in the CCPU obtains current radio frequency band information of the device. When a radio frequency band changes, the radio frequency band information is transmitted to the MIPI clock frequency screening module. Preferably, the radio frequency band information further includes the radio frequency band information of the neighboring cell.

The MIPI clock frequency screening module in the MTC module receives the foregoing radio frequency band information, and selects, according to a correspondence of interference from an MIPI clock frequency to a radio frequency band, an MIPI clock frequency causing no interference to a radio frequency band currently used by the device. Preferably, while ensuring that the radio frequency band currently used by the device is not interfered, an MIPI clock frequency causing no interference to a radio frequency band used in the neighboring serving cell is selected. After the MIPI clock frequency is determined, the MIPI clock frequency selected by means of screening is sent to the MIPI clock frequency control module.

To reduce power consumption caused during ACPU wakeup, the MIPI clock frequency selected by means of screening needs to be sent when the device is in a screen-on state. If the device is in a screen-off state, it indicates that a display screen currently does not need to perform displaying, that is, an MIPI is not working. Therefore, no interference is caused to a radio frequency. In addition, to avoid frequently sending messages to the ACPU and reduce sending frequency, the MTC module may set a sending time interval to a specific time. For example, sending may be controlled to be performed every 30 seconds. To further reduce the sending frequency, it may be first determined whether the to-be-sent MIPI clock frequency is the same as an MIPI clock frequency sent last time, and if the to-be-sent MIPI clock frequency is the same as the MIPI clock frequency sent last time, the MIPI clock frequency is not sent.

Sending at intervals may be implemented by using a timer. A specific implementation manner may be: the timer starts when the MIPI clock frequency is being sent to the MIPI clock frequency control module; before the timer expires, an MIPI clock frequency determined by the MIPI clock frequency screening module is collected; and when the timer expires, a latest updated MIPI clock frequency is used and sent to the MIPI clock frequency control module.

In this embodiment, the MIPI clock frequency control module may receive MIPI clock frequencies sent by multiple MIPI clock frequency screening modules. Therefore, a same MIPI clock frequency sent by the multiple MIPI clock frequency screening modules, or an MIPI clock frequency sent by a largest quantity of MIPI clock frequency screening modules may be preferentially selected as the MIPI clock frequency to be configured as.

After an ACPU RIL layer receives the MIPI clock frequency from the CCPU, an MIPI clock frequency control module in an RIL module in the ACPU configures a new MIPI clock frequency for an MIPI driver module by using an EDC in a function call manner.

Figure 7:
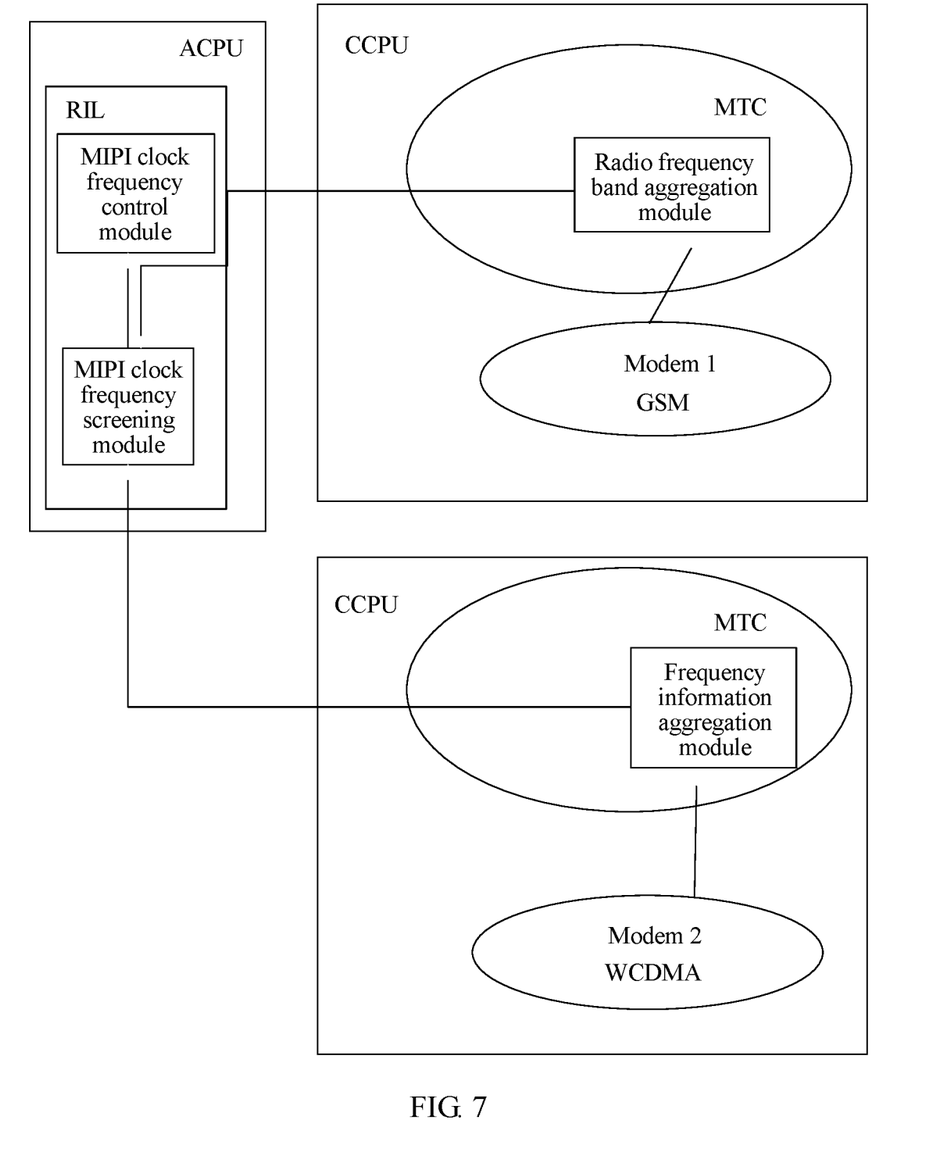
FIG. 7 is a schematic structural diagram of yet another communications device according to an embodiment of the present invention.

With reference to FIG. 7, FIG. 7 is another implementation manner applied to the smartphone according to an embodiment. Different from the foregoing implementation manner, in this implementation manner, an MIPI clock frequency screening module is integrated into the ACPU. Optionally, an MIPI clock frequency screening module may be integrated into an MIPI clock frequency control module, so that the MIPI clock frequency control module has a function of the MIPI clock frequency screening module. In this case, the MIPI clock frequency screening module may select an MIPI clock frequency by means of screening according to situations in all network modes. A specific implementation manner of each module is similar to the foregoing implementation manner, and details are not repeatedly described herein.

It can be learned that in this embodiment of the present invention, current radio frequency band information of a device is obtained, the radio frequency band information is reported when a current radio frequency band of the device changes, an MIPI clock frequency causing no interference to the current radio frequency band of the device is further selected by means of screening, and an MIPI clock frequency of the device is changed to the MIPI clock frequency causing no interference. This ensures that when a current radio frequency of the device changes, the MIPI clock frequency currently used by the device causes no interference to the radio frequency, thereby improving communication quality of a communications device.

In addition, switching is performed only when the device is in a screen-on state, or switching is performed only when the MIPI clock frequency selected by means of screening is different from the MIPI clock frequency used by the device, or screening is performed only after a specific time interval, or the MIPI clock frequency selected by means of screening causes no interference to a neighboring cell as far as possible, so that a quantity of times for screening or switching an MIPI clock frequency is reduced. This saves system resources, and reduces power consumption of the communications device.

In addition, switching is performed only when an MIPI is in an idle state, or when an EDC is in a blanking zone, thereby reducing impact caused by MIPI switching on a display effect of a display screen, and improving user experience.

The described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments without creative efforts.

Based on the description of the foregoing implementation manners, a person skilled in the art may clearly understand that the apparatus described in the accompany drawings of the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobile industry processor interface (MIPI) clock frequency configuration method, wherein the method comprises:
   when a radio frequency band used by a device on which an MIPI is located changes, determining an MIPI clock frequency according to radio frequency band information, wherein the radio frequency band information indicates the radio frequency band currently used by the device, and the determined MIPI clock frequency causes no interference to the radio frequency band currently used by the device;
   determining whether a current MIPI clock frequency of the device is different from the determined MIPI clock frequency; and
   when the current MIPI clock frequency of the device is different from the determined MIPI clock frequency, and when a display screen of the device is turned on or the MIPI is in an idle state, configuring the MIPI clock frequency of the device as the determined MIPI clock frequency.

2. The method according to claim 1, wherein the determining an MIPI clock frequency according to radio frequency band information comprises:

determining, according to the radio frequency band currently used by the device and a preset correspondence, that the MIPI clock frequency is an MIPI clock frequency causing interference of a lowest level to the radio frequency band currently used by the device, wherein the preset correspondence comprises levels of interference from different MIPI clock frequencies to the radio frequency band currently used by the device.

3. The method according to claim 1, wherein the determining an MIPI clock frequency according to radio frequency band information comprises:

determining, according to the radio frequency band currently used by the device and a preset correspondence, MIPI clock frequencies causing interference of levels lower than a preset threshold to the radio frequency band currently used by the device, wherein the preset correspondence comprises levels of interference from different MIPI clock frequencies to the radio frequency band currently used by the device; and determining the MIPI clock frequency from the MIPI clock frequencies causing the interference of levels lower than the preset threshold to the radio frequency band currently used by the device.

4. The method according to claim 3, wherein determining the MIPI clock frequency from the MIPI clock frequencies causing the interference of levels lower than the preset threshold to the radio frequency band currently used by the device comprises:

determining, according to the preset correspondence, that an MIPI clock frequency causing interference of a level lower than the preset threshold to a largest quantity of radio frequency bands is the determined MIPI clock frequency.

5. The method according to claim 3, wherein
the radio frequency band information further comprises a radio frequency band of a neighboring cell of a serving cell in which the device is currently located; and
determining the MIPI clock frequency from the MIPI clock frequencies causing the interference of levels lower than the preset threshold to the radio frequency band currently used by the device comprises:
determining, according to the radio frequency band of the neighboring cell of the serving cell in which the device is currently located, the MIPI clock frequency from the MIPI clock frequencies causing the interference of levels lower than the preset threshold to the radio frequency band currently used by the device.

6. The method according to claim 5, wherein the determining, according to the radio frequency band of the neighboring cell of the serving cell in which the device is currently located, the MIPI clock frequency from the MIPI clock frequencies causing the interference of levels lower than the preset threshold to the radio frequency band currently used by the device comprises:

selecting, from the MIPI clock frequencies causing the interference of levels lower than the preset threshold to the radio frequency band currently used by the device and according to radio frequency band information of the neighboring cell and the preset correspondence, an MIPI clock frequency causing interference of a level lower than the preset threshold to a largest quantity of radio frequency bands of the neighboring cell as the determined MIPI clock frequency.

7. A communications device, wherein the communications device comprises a processor, a memory, and a mobile industry processor interface (MIPI), wherein the memory is configured to store a computer program; and by reading the computer program, the processor is configured to:

when a radio frequency band used by the communications device changes, determine an MIPI clock frequency according to radio frequency band information, wherein the radio frequency band information indicates the radio frequency band currently used by the communications device, and the determined MIPI clock frequency causes no interference to the radio frequency band currently used by the communications device;

determine whether a current MIPI clock frequency of the device is different from the determined MIPI clock frequency; and when the current MIPI clock frequency of the device is different from the determined MIPI clock frequency, and when a display screen of the device is turned on or the MIPI is in an idle state, the processor is configured to configure the MIPI clock frequency of the device as the determined MIPI clock frequency.

8. The communications device according to claim 7, wherein the processor is configured to:

determine, according to the radio frequency band currently used by the communications device and a preset correspondence, that the MIPI clock frequency is an MIPI clock frequency causing interference of a lowest level to the radio frequency band currently used by the communications device, wherein the preset correspondence comprises levels of interference from different MIPI clock frequencies to the radio frequency band currently used by the communications device.

9. The communications device according to claim 7, wherein the processor is configured to:

determine, according to the radio frequency band currently used by the communications device and a preset correspondence, MIPI clock frequencies causing interference of levels lower than a preset threshold to the radio frequency band currently used by the communications device, wherein the preset correspondence comprises levels of interference from different MIPI clock frequencies to the radio frequency band currently used by the communications device; and determine the MIPI clock frequency from the MIPI clock frequencies causing the interference of levels lower than the preset threshold to the radio frequency band currently used by the communications device.

10. The communications device according to claim 9, wherein the processor is configured to:

determine, according to the preset correspondence, that an MIPI clock frequency causing interference of a level lower than the preset threshold to a largest quantity of radio frequency bands is the determined MIPI clock frequency.

11. The communications device according to claim 9, wherein the processor is configured to:

determine, according to the radio frequency band of a neighboring cell of a serving cell in which the communications device is currently located, the MIPI clock frequency from the MIPI clock frequencies causing the interference of levels lower than the preset threshold to the radio frequency band currently used by the communications device.

12. The communications device according to claim 11, wherein the processor is configured to:

select, from the MIPI clock frequencies causing the interference of levels lower than the preset threshold to the radio frequency band currently used by the communications device and according to radio frequency band information of the neighboring cell and the preset correspondence, an MIPI clock frequency causing interference of a level lower than the preset threshold to a largest quantity of radio frequency bands of the neighboring cell as the determined MIPI clock frequency.

13. A non-transitory computer-readable medium comprising code that, when executed, causes an apparatus to:
determine an MIPI clock frequency according to radio frequency band information when a radio frequency band used by a device on which an MIPI is located changes, wherein the radio frequency band information indicates the radio frequency band currently used by the device, and the determined MIPI clock frequency causes no interference to the radio frequency band currently used by the device;
determine whether a current MIPI clock frequency of the device is different from the determined MIPI clock frequency; and
when the current MIPI clock frequency of the device is different from the determined MIPI clock frequency, and when a display screen of the device is turned on or the MIPI is in an idle state, the apparatus is caused to configure the MIPI clock frequency of the device as the determined MIPI clock frequency.

14. The non-transitory computer readable medium of claim 13, further comprising code that, when executed, causes an apparatus to:
determine, according to the radio frequency band currently used by the device and a preset correspondence, that the MIPI clock frequency is an MIPI clock frequency causing interference of a lowest level to the radio frequency band currently used by the device, wherein the preset correspondence comprises levels of interference from different MIPI clock frequencies to the radio frequency band currently used by the device.

15. The non-transitory computer readable medium of claim 13, further comprising code that, when executed, causes an apparatus to:
determine, according to the radio frequency band currently used by the device and a preset correspondence, MIPI clock frequencies causing interference of levels lower than a preset threshold to the radio frequency band currently used by the device, wherein the preset correspondence comprises levels of interference from different MIPI clock frequencies to the radio frequency band currently used by the device; and
determine the MIPI clock frequency from the MIPI clock frequencies causing the interference of levels lower than the preset threshold to the radio frequency band currently used by the device.

16. The non-transitory computer readable medium of claim 13, further comprising code that, when executed, causes an apparatus to:
determine, according to the preset correspondence, that an MIPI clock frequency causing interference of a level lower than the preset threshold to a largest quantity of radio frequency bands is the determined MIPI clock frequency.

17. The non-transitory computer readable medium of claim 13, wherein the radio frequency band information further comprises a radio frequency band of a neighboring cell of a serving cell in which the device is currently located, and wherein the non-transitory computer readable medium further comprising code that, when executed, causes an apparatus to:
determine the MIPI clock frequency from the MIPI clock frequencies causing the interference of levels lower than the preset threshold to the radio frequency band currently used by the device comprises:
determine, according to the radio frequency band of the neighboring cell of the serving cell in which the device is currently located, the MIPI clock frequency from the MIPI clock frequencies causing the interference of levels lower than the preset threshold to the radio frequency band currently used by the device.

18. The non-transitory computer readable medium of claim 17, further comprising code that, when executed, causes an apparatus to:
select, from the MIPI clock frequencies causing the interference of levels lower than the preset threshold to the radio frequency band currently used by the device and according to radio frequency band information of the neighboring cell and the preset correspondence, an MIPI clock frequency causing interference of a level lower than the preset threshold to a largest quantity of radio frequency bands of the neighboring cell as the determined MIPI clock frequency.

* * * * *